(12) United States Patent
Suzuki

(10) Patent No.: US 11,628,832 B2
(45) Date of Patent: Apr. 18, 2023

(54) PARKING ASSISTANCE DEVICE

(71) Applicant: AISIN CORPORATION, Kariya (JP)

(72) Inventor: Takashi Suzuki, Kariya (JP)

(73) Assignee: AISIN CORPORATION, Kariya (JP)

( * ) Notice: Subject to any disclaimer, the term of this patent is extended or adjusted under 35 U.S.C. 154(b) by 244 days.

(21) Appl. No.: 17/036,713

(22) Filed: Sep. 29, 2020

(65) Prior Publication Data

US 2021/0094536 A1    Apr. 1, 2021

(30) Foreign Application Priority Data

Sep. 30, 2019  (JP) .............................. JP2019-179344

(51) Int. Cl.
*B60W 30/06* (2006.01)
*G05D 1/02* (2020.01)
*G08G 1/14* (2006.01)

(52) U.S. Cl.
CPC ........... *B60W 30/06* (2013.01); *G05D 1/0212* (2013.01); *G08G 1/14* (2013.01); *B60W 2552/53* (2020.02)

(58) Field of Classification Search
CPC ........ B60W 30/06; G05D 1/0212; G08G 1/14
USPC ....................................................... 701/117
See application file for complete search history.

(56) References Cited

U.S. PATENT DOCUMENTS

| 10,494,025 | B2 * | 12/2019 | Nakamura | ............ | B60W 30/06 |
| 11,136,034 | B2 * | 10/2021 | Sano | ........................ | G08G 1/00 |
| 2013/0085637 | A1 * | 4/2013 | Grimm | .............. | B62D 15/0285 |
| | | | | | 701/25 |

FOREIGN PATENT DOCUMENTS

| DE | 102013015348 A1 | 4/2014 |
| DE | 102016100235 A1 | 7/2017 |
| EP | 3401190 A1 | 11/2018 |
| JP | 2013-530867 A | 8/2013 |

OTHER PUBLICATIONS

Communication dated Feb. 9, 2021, from the European Patent Office in European Application No. 20199111.4.

* cited by examiner

*Primary Examiner* — Peter D Nolan
*Assistant Examiner* — Luke Huynh
(74) *Attorney, Agent, or Firm* — Sughrue Mion, PLLC

(57) ABSTRACT

A parking assistance device includes: a situation information acquisition unit acquiring, when a vehicle is repeatedly parked at a parking target position, peripheral situation information; a storage control unit storing first situation information indicating the peripheral situation information and a movement route for the parking target position; an information updating unit updating, when new information is included in second situation information acquired when newly parking at the parking target position and a region specified by the new information does not interfere with a region where the movement route exists, the first situation information by the second situation information; a current position estimation unit estimating a current position by comparing the first and second situation information; and a guidance control unit guiding the vehicle to the parking target position according to the estimated current position and the movement route.

3 Claims, 6 Drawing Sheets

PARKING ASSISTANCE DEVICE

CROSS REFERENCE TO RELATED APPLICATIONS

This application is based on and claims priority under 35 U.S.C. § 119 to Japanese Patent Application 2019-179344, filed on Sep. 30, 2019, the entire content of which is incorporated herein by reference.

TECHNICAL FIELD

An embodiment of this disclosure relates to a parking assistance device.

BACKGROUND DISCUSSION

In related art, a parking assistance device that guides a vehicle to a parking target position in a parking space (for example, a home garage) has been put into practical use. For example, information on surroundings of the parking target position learned in advance is compared with information on the surroundings of the parking target position acquired when parking is actually performed, and a host vehicle position is specified such that the vehicle is guided to the parking space simply by performing route calculation of difference with respect to a movement route used in the past.

However, there are cases where a peripheral situation of the parking target position changes in the home garage or the like. For example, there are cases where a shelf is newly provided or luggage is regularly placed. In such cases, the surrounding information learned in advance may not be consistent with the surrounding information acquired when the parking is actually performed, and thus the host vehicle position cannot be specified. As a result, a parking assistance process may be canceled even when the movement route used in the past is available. Therefore, it will be meaningful to provide a parking assistance device that can respond even when a peripheral situation of the parking target position is changed and can continuously specify the host vehicle position with high accuracy.

SUMMARY

A parking assistance device according to an embodiment of this disclosure, for example, includes: a situation information acquisition unit configured to, when a vehicle is repeatedly parked at a same parking target position, acquire peripheral situation information of a peripheral region including the parking target position detected by a detection unit provided in the vehicle; a storage control unit configured to store first situation information indicating the peripheral situation information and a movement route for reaching the parking target position, which are acquired when the vehicle completes the parking at the parking target position; an information updating unit configured to, in a case where, when comparing the first situation information with second situation information which indicates the peripheral situation information acquired when the vehicle newly parks at the parking target position, new information which is not included in the first situation information is included in the second situation information and a region specified by the new information does not interfere with a region where the movement route exists, update the first situation information by the second situation information which includes the new information; a current position estimation unit configured to estimate a current position of the vehicle by comparing the first situation information with the second situation information; and a guidance control unit configured to guide the vehicle to the parking target position according to the estimated current position and the movement route.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment of the disclosure will be disclosed. A configuration of the embodiment described below and actions, results, and effects provided by the configuration are examples. The disclosure can be realized by configurations other than those disclosed in the following embodiment, and at least one of various effects based on a basic configuration and derived effects can be obtained.

Figure 1:
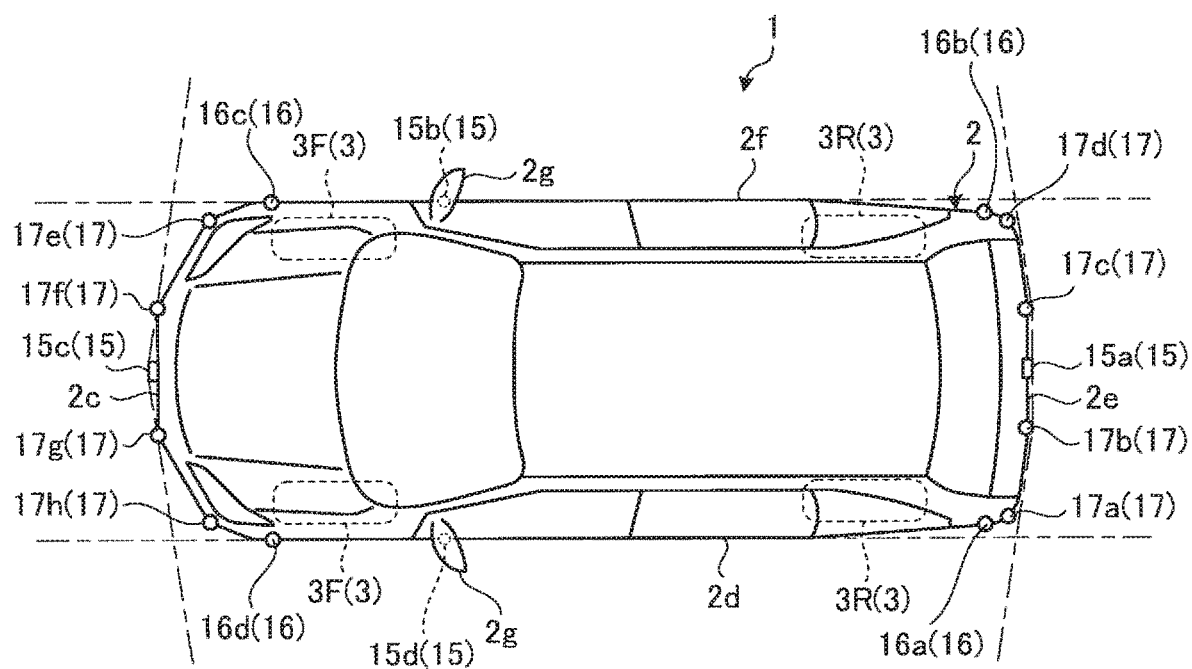
FIG. 1 is a schematic plan view showing an example of a vehicle where a parking assistance device according to an embodiment can be mounted.

FIG. 1 is a schematic plan view of a vehicle 1 where a parking assistance device of the embodiment is mounted. The vehicle 1 may be, for example, an automobile (internal combustion engine automobile) which uses an internal combustion engine (engine, not shown) as a drive source, an automobile (electric automobile, fuel cell automobile or the like) which uses an electric motor (motor, not shown) as the drive source, or an automobile (hybrid automobile) which uses both the internal combustion engine and the electric motor as the drive source. The vehicle 1 can be equipped with various transmission devices, and can be equipped with various devices (systems, components and the like) necessary for driving the internal combustion engine and the electric motor. Methods, numbers, layouts, and the like of devices related to driving of wheels 3 (front wheels 3F and rear wheels 3R) of the vehicle 1 can be set variously.

As shown in FIG. 1, a vehicle body 2 of the vehicle 1 is provided with, for example, a plurality of image capturing units 15, a plurality of radars 16 and sonars 17 each as a detection unit that acquires situation information around the vehicle 1.

For example, four image capturing units 15a to 15d are provided as the plurality of image capturing units 15. Each image capturing unit 15 is, for example, a digital camera where an image capturing element such as a charge coupled device (CCD) or a CMOS image sensor (CIS) is incorporated. The image capturing unit 15 can output moving image data (captured image data) at a predetermined frame rate. Each image capturing unit 15 includes a wide-angle lens or a fish-eye lens, and can capture images, for example, in a range of 140° to 220° in a horizontal direction. An optical axis of the image capturing unit 15 (15a to 15d) may be set in a diagonally downward direction, for example. The image capturing unit 15 (15a to 15d) sequentially captures an image of a peripheral situation of outside of the vehicle 1 including a road surface where the vehicle 1 can move, a mark on the road surface (such as an arrow, a lane marking, and a parking frame indicating a parking space or a lane separation line) or an object (obstacles such as pedestrians and other vehicles), and outputs the captured image as captured image data.

The image capturing unit 15a is located at, for example, a rear end portion 2e of the vehicle body 2, is provided on a wall portion below a rear window, and captures an image of a situation of a rear region of the vehicle 1. The image capturing unit 15b is located at, for example, a right end portion 2f of the vehicle body 2, is provided on a right door mirror 2g, and captures an image of a situation of a region including a right front side, a right side, and a right rear side of the vehicle 1. The image capturing unit 15c is located at, for example, a front side of the vehicle body 2, that is, a front end portion 2c of the vehicle body 2 in a vehicle front-rear direction, is provided on a front bumper or the like, and captures an image of a situation of a front region of the vehicle 1. The image capturing unit 15d is located at, for example, a left side of the vehicle body 2, that is, a left end portion 2d in a vehicle width direction, is provided on a left door mirror 2g, which is a protruding portion on the left side, and captures an image of a region including a left front side, the left side, and a left rear side of the vehicle 1. An ECU 14 (see FIG. 2) constituting the parking assistance device can also execute arithmetic processing and image processing based on the captured image data obtained by the plurality of image capturing units 15 so as to generate an image with a wider viewing angle or to generate a virtual overhead view image of the vehicle 1 as viewed from above.

The vehicle 1 includes the plurality of radars 16 which each serve as a distance measuring unit capable of measuring a distance to an object existing outside the vehicle 1. Each radar 16 is, for example, a millimeter wave radar, and is capable of measuring a distance to an object existing in a traveling direction of the vehicle 1. In the embodiment, the vehicle 1 includes a plurality of radars 16a to 16d. The radar 16a is provided at, for example, a left end portion of a rear bumper of the vehicle 1, and is capable of measuring a distance to an object existing on the left rear side of the vehicle 1. The radar 16b is provided at a right end portion of the rear bumper of the vehicle 1, and is capable of measuring a distance to an object existing on the right rear side of the vehicle 1. The radar 16c is provided at a right end portion of the front bumper of the vehicle 1, and is capable of measuring a distance to an object existing on the right front side of the vehicle 1. The radar 16d is provided at a left end portion of the front bumper of the vehicle 1, and is capable of measuring a distance to an object existing on the left front side of the vehicle 1.

The vehicle 1 includes the sonars 17 which are capable of measuring a distance to an external object existing at a relatively short distance from the vehicle 1 using ultrasonic waves. In the embodiment, the vehicle 1 includes a plurality of sonars 17a to 17h. The sonars 17a to 17d are provided on the rear bumper of the vehicle 1, and can measure a distance to an object existing behind the vehicle. The sonars 17e to 17h are provided on the front bumper of the vehicle 1, and can measure a distance to an object existing in front of the vehicle 1.

Figure 2:
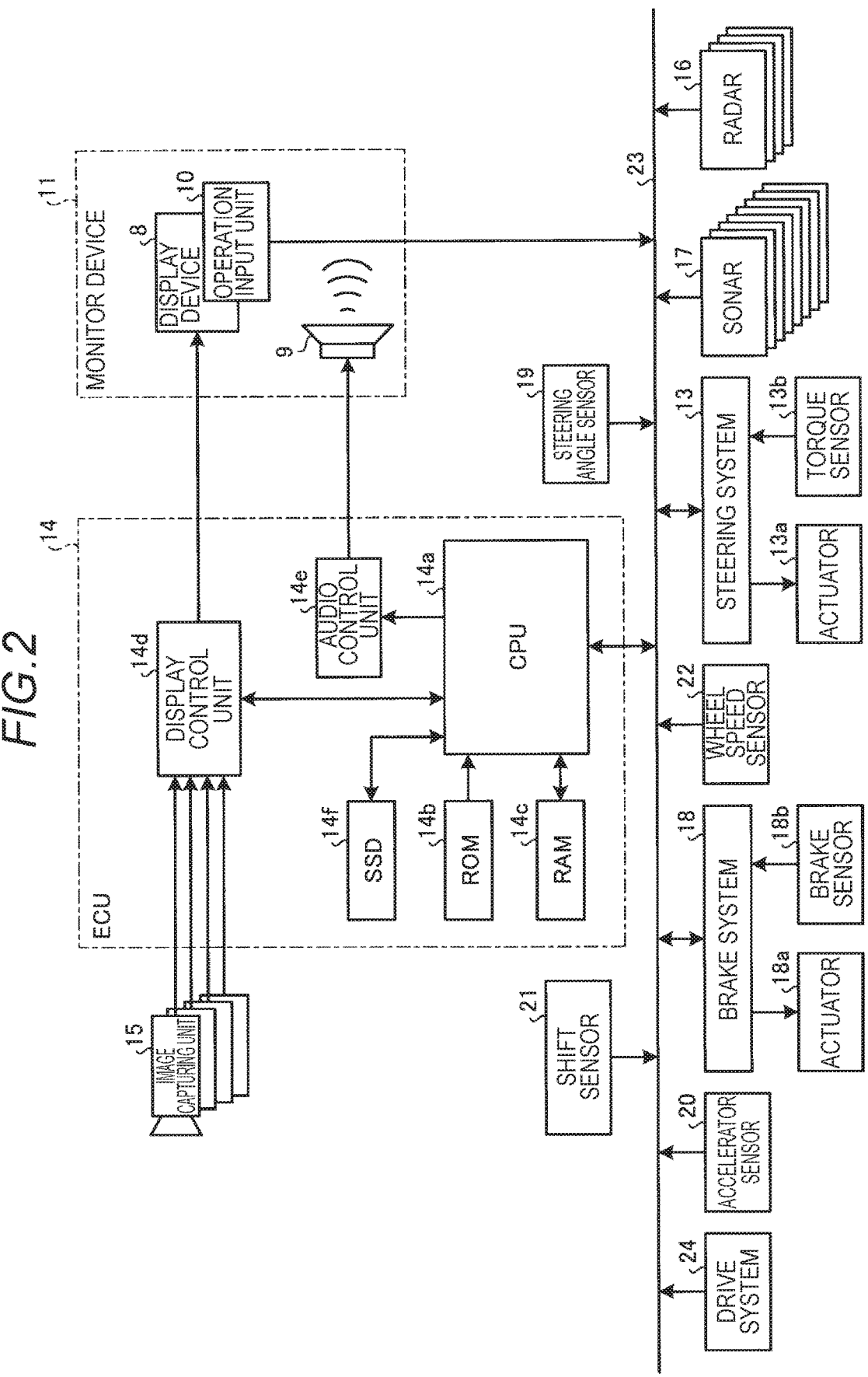
FIG. 2 is an exemplary block diagram of a configuration of a control system including the parking assistance device according to the embodiment.

FIG. 2 is an exemplary and schematic block diagram showing a functional configuration of a control system of the vehicle 1 including the parking assistance device according to the embodiment. As shown in FIG. 2, in addition to the ECU 14, the radars 16, the sonars 17 and the like, a monitor device 11, a steering system 13, a brake system 18, a steering angle sensor 19, an accelerator sensor 20, a shift sensor 21, a wheel speed sensor 22, a drive system 24 and the like are electrically connected in the control system via an in-vehicle network 23 which serves as an electric communication line. The in-vehicle network 23 is configured as, for example, a controller area network (CAN). The ECU 14 can send a control signal through the in-vehicle network 23 so as to control the steering system 13, the brake system 18, the drive system 24 and the like.

A display device 8 and an audio output device 9 which serves as an audio output unit are provided in a vehicle interior of the vehicle 1. The display device 8 is, for example, a liquid crystal display (LCD) or an organic electroluminescent display (OLED). The audio output device 9 is, for example, a speaker. The display device 8, for example, is covered with a transparent operation input unit 10, such as a touch panel. An occupant (user) can visually recognize an image displayed on a display screen of the display device 8 via the operation input unit 10. The occupant can also perform an operation input through touching, pressing or moving the operation input unit 10 with a finger or the like at a position corresponding to the image displayed on the display screen of the display device 8. The display device 8, the audio output device 9, the operation input unit 10 and the like are provided, for example, on the monitor device 11 which is located at a central portion of a dashboard in the vehicle width direction (that is, a left-right direction). The monitor device 11 may include operation input units that are not shown, such as switches, dials, joysticks and push buttons. An audio output device that is not shown can also be provided at another position different from the monitor device 11 in the vehicle interior, and audio can be output from the audio output device 9 of the monitor device 11 and another audio output device. The monitor device 11 can also be used as a navigation system or an audio system, for example.

The ECU 14 can receive detection results of a torque sensor 13b, a brake sensor 18b, the steering angle sensor 19, the radars 16, the sonars 17, the accelerator sensor 20, the shift sensor 21, the wheel speed sensor 22 and the like, and can receive an operation signal of the operation input unit 10 and the like via the the in-vehicle network 23.

The steering system 13 is an electric power steering system, a steer by wire (SBW) system or the like. The steering system 13 includes an actuator 13a and the torque sensor 13b. The steering system 13 is electrically controlled by the ECU 14 and the like such that the actuator 13a is operated and torque is applied to a steering unit (steering wheel or the like) to supplement a steering force, so that the wheels 3 are steered. The torque sensor 13b detects the torque which is applied to the steering unit by a driver, and transmits a detection result thereof to the ECU 14.

The brake system 18 includes: an anti-lock brake system (ABS) that controls locking of a brake of the vehicle 1; a skid prevention device (ESC: Electronic Stability Control) that prevents skidding of the vehicle 1 at the time of cornering; an electric brake system that enhances a braking force to assist braking; and a brake by wire (BBW). The brake system 18 includes an actuator 18a and the brake sensor 18b. The brake system 18 is electrically controlled by the ECU 14 and the like, and applies a braking force to the wheels 3 via the actuator 18a. The brake system 18 detects the locking of the brake, idling of the wheels 3, a sign of skidding and the like based on a difference in rotation between the left and right wheels 3, and performs control to prevent the locking of the brake, the idling of the wheels 3, and the skidding. The brake sensor 18b is a displacement sensor that detects a position of a brake pedal which serves as a movable portion of a braking operation unit, and transmits a detection result of the position of the brake pedal to the ECU 14.

The steering angle sensor 19 is a sensor that detects a steering amount of the steering unit such as the steering wheel. The steering angle sensor 19 includes a Hall element and the like, detects a rotation angle of a rotating portion of the steering unit as the steering amount, and transmits a detection result thereof to the ECU 14. The accelerator sensor 20 is a displacement sensor that detects a position of an accelerator pedal which serves as a movable portion of an acceleration operation unit, and transmits a detection result thereof to the ECU 14.

The shift sensor 21 is a sensor that detects a position of a movable portion (such as a bar, an arm or a button) of a shift operation unit, and transmits a detection result thereof to the ECU 14. The wheel speed sensor 22 is a sensor that includes a Hall element or the like and detects a rotation amount of the wheels 3 and the number of rotation per unit time of the wheels 3, and transmits a detection result thereof to the ECU 14.

The drive system 24 is an internal combustion engine (engine) system or a motor system which serves as the drive source. The drive system 24 controls a fuel injection amount and an intake amount of the engine or controls an output value of the motor in accordance with an operation amount (for example, a depression amount of the accelerator pedal) required by the driver (user) detected by the accelerator sensor 20. Output values of the engine or the motor can also be controlled in cooperation with control of the steering system 13 or the brake system 18 in accordance with a travel state of the vehicle 1 regardless of the operation of the user. For example, traveling assistance such as normal traveling assistance and parking assistance can be performed.

The configurations, arrangement, electric connection modes and the like of the various sensors and actuators described above are examples, and can be variously set (changed).

The ECU 14 is constituted by a computer or the like, and manages overall control of the vehicle 1 by cooperation of hardware and software. Specifically, the ECU 14 includes a central processing unit (CPU) 14a, a read-only memory (ROM) 14b, a random access memory (RAM) 14c, a display control unit 14d, an audio control unit 14e, and a solid state drive (SSD) 14f. The CPU 14a, the ROM 14b, and the RAM 14c may be provided on the same circuit board.

The CPU 14a can read out a program installed and stored in a non-volatile storage device such as the ROM 14b, and execute arithmetic processing in accordance with the program. For example, the CPU 14a can execute a process of recognizing a situation around the vehicle 1 and a parking target position based on peripheral situation information acquired by the image capturing units 15, the radars 16, the sonars 17 and the like. The CPU 14a can execute a process of extracting a change in a peripheral situation based on information indicating a situation around the vehicle 1 (peripheral situation information) acquired at different timing, a process of estimating a current position of the vehicle 1 based on the peripheral situation information, a process of storing information that reflects the change in the peripheral situation, a process of utilizing the stored information, a process of guiding the vehicle 1 to the parking target position and the like. When an image captured by the image capturing unit 15 is displayed on the display device 8, the CPU 14a can execute a distortion correction process of correcting distortion by performing arithmetic processing or image processing on a captured image (curved image) of a wide-angle image obtained by the image capturing unit 15, or generate an overhead view image (peripheral image) that displays a vehicle image indicating the vehicle 1 (host vehicle icon) at a central position based on the captured image captured by the image capturing unit 15. When generating the overhead view image, the CPU 14a can change a position of a virtual viewpoint and generate the overhead view image in which a vehicle image is viewed from directly above or the overhead view image in which the vehicle image is viewed from an oblique direction.

The ROM 14b stores various programs, parameters necessary for execution of the programs, and the like. The RAM 14c temporarily stores various data to be used in calculation in the CPU 14a. Among the arithmetic processing in the ECU 14, the display control unit 14d mainly performs image processing on the image data which is acquired from the image capturing unit 15 and output to the CPU 14a, conversion of the image data acquired from the CPU 14a into display image data to be displayed on the display device 8 and the like. Among the arithmetic processing in the ECU 14, the audio control unit 14e mainly performs processing on audio acquired from the CPU 14a and output to the audio output device 9. The SSD 14f is a rewritable non-volatile storage unit, and continues to store data acquired from the CPU 14a even when power of the ECU 14 is turned off. The CPU 14a, the ROM 14b, the RAM 14c and the like can be integrated in the same package. The ECU 14 may also have a configuration in which another logical operation processor such as a digital signal processor (DSP), a logic circuit or the like is used instead of the CPU 14a. A hard disk drive (HDD) may also be provided instead of the SSD 14f, or the SSD 14f and the HDD may be provided separately from the ECU 14.

Figure 3:
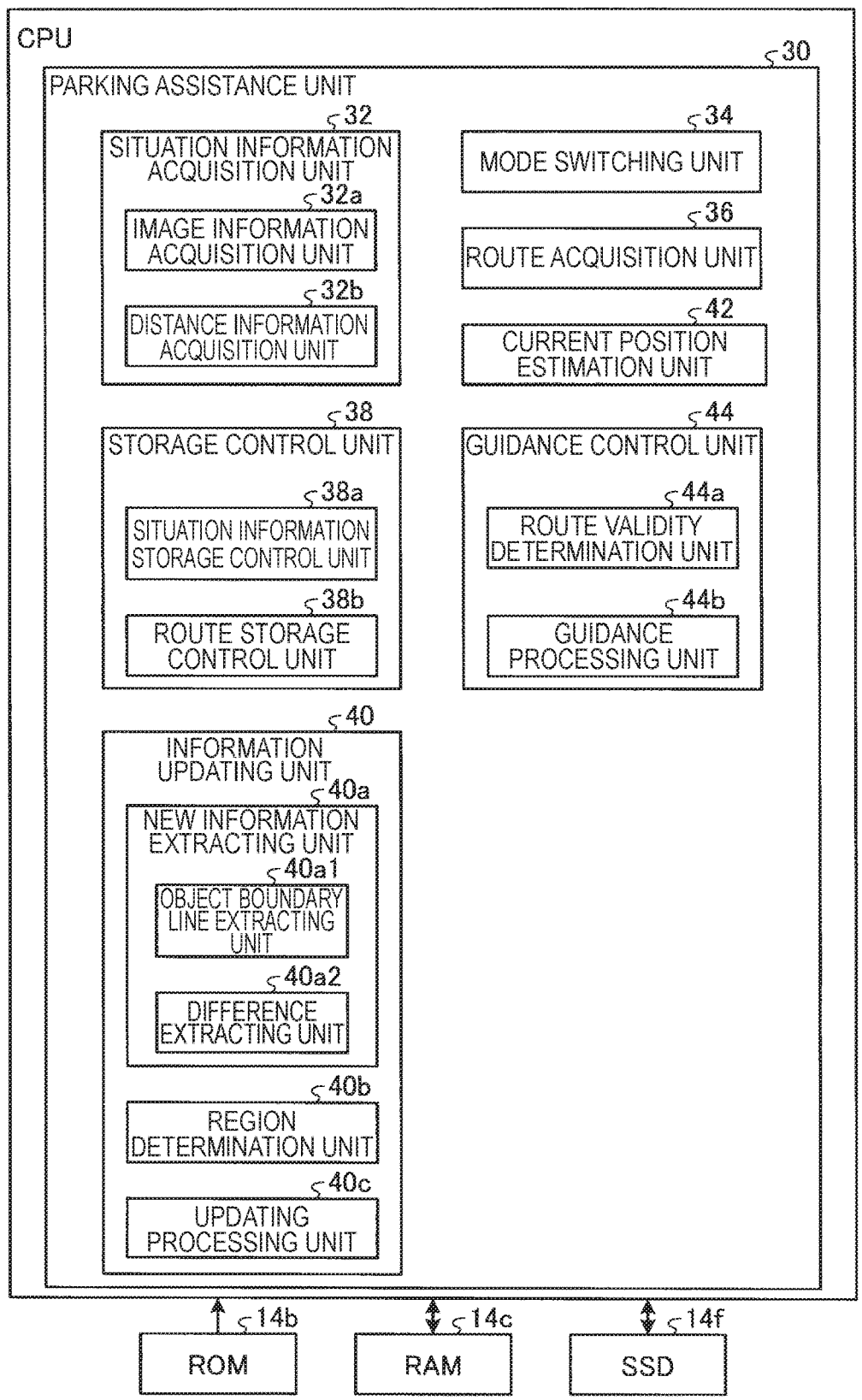
FIG. 3 is a block diagram exemplarily showing a configuration in a case where the parking assistance device (parking assistance unit) according to the embodiment is realized by a CPU.

FIG. 3 is a block diagram exemplarily and schematically showing a configuration in a case where the parking assistance device (parking assistance unit 30) according to the embodiment is realized by the CPU 14a. By executing a parking assistance program read from the ROM 14b, the CPU 14a realizes the parking assistance unit 30 which includes modules such as a situation information acquisition unit 32, a mode switching unit 34, a route acquisition unit 36, a storage control unit 38, an information updating unit 40, a current position estimation unit 42 and a guidance control unit 44, as shown in FIG. 3. The situation information acquisition unit 32 includes detailed modules such as an image information acquisition unit 32*a* and a distance information acquisition unit 32*b*. The storage control unit 38 includes detailed modules such as a situation information storage control unit 38*a* and a route storage control unit 38*b*. The information updating unit 40 includes detailed modules such as a new information extracting unit 40*a*, a region determination unit 40*b* and an updating processing unit 40*c*. The guidance control unit 44 includes detailed modules such as a route validity determination unit 44*a* and a guidance processing unit 44*b*. Part or all of the situation information acquisition unit 32, the mode switching unit 34, the route acquisition unit 36, the storage control unit 38, the information updating unit 40, the current position estimation unit 42 and the guidance control unit 44 may be configured by hardware such as a circuit. Although not shown in FIG. 3, the CPU 14*a* can also realize various modules necessary for traveling of the vehicle 1. Although FIG. 2 mainly shows the CPU 14*a* that executes a parking assistance process, a CPU for realizing various modules necessary for the traveling of the vehicle 1 may also be provided, or an ECU other than the ECU 14 may also be provided.

The situation information acquisition unit 32 acquires peripheral situation information of a peripheral region including a parking target position detected by the detection unit provided in the vehicle 1. The situation information acquisition unit 32 acquires the peripheral situation information when parking is performed in a parking lot where the driver has never parked the vehicle in the past, and also acquires the peripheral situation information of the peripheral region when the vehicle 1 is repeatedly parked at the same parking target position. Here, the "same parking target position" refers to, for example, a movement target position set in a predetermined parking lot or the like which is determined to be used, such as a home parking lot (garage), a contract parking lot or a car sharing. That is, the "same parking target position" is a target position which is determined in a parking lot where the vehicle 1 has a high possibility to be repeatedly parked and is determined to stop the vehicle 1 within a predetermined parking region of the parking lot.

The image information acquisition unit 32*a* included in the situation information acquisition unit 32 sequentially acquires a captured image (peripheral image), which is captured by the image capturing unit 15 and indicates a peripheral situation of the vehicle 1 including a road surface where the vehicle 1 is located, during execution of a learning mode and during execution of an automatic guidance mode to be described later. The image information acquisition unit 32*a* may sequentially acquire captured images captured by the image capturing units 15 (15*a* to 15*d*). In another example, the image information acquisition unit 32*a* may selectively acquire a captured image in a travelable direction such that peripheral situation information in the travelable direction can be acquired based on information on the travelable direction (forward direction or backward direction) of the vehicle 1 that can be acquired from the shift sensor 21.

The distance information acquisition unit 32*b* included in the situation information acquisition unit 32 acquires distance information, which is acquired by the radars 16 and the sonars 17, to objects (structures such as walls, shelves, flower beds, or columns, or other vehicles, pedestrians or the like) around the vehicle 1 including the road surface where the vehicle 1 is located. Like the image information acquisition unit 32*a*, the distance information acquisition unit 32*b* may also sequentially acquire the distance information acquired by each radar 16 (16*a* to 16*d*) and sonar 17 (17*a* to 17*h*). In another example, the distance information acquisition unit 32*b* may selectively acquire distance information in the travelable direction such that distance information to objects located in the travelable direction can be acquired based on information on the travelable direction (forward direction or backward direction) of the vehicle 1 that can be acquired from the shift sensor 21. It should be noted that the situation information acquisition unit 32 may use both the image information and the distance information as the peripheral situation information, or may acquire one of the image information and the distance information. When both the image information and the distance information are used, accuracy and reliability of the peripheral situation information can be improved. On the other hand, when either one of the image information and the distance information is used, the detection unit of the other one which is not used can be omitted in the system, which can contribute to cost reduction and processing reduction.

The mode switching unit 34 performs a process of switching between the learning mode executed when the vehicle 1 is parked at a parking lot for a first time (parking target position parked for the first time) and the automatic guidance mode executed when the vehicle 1 is parked at a parking lot that has a history of parking in the past (parking target position where the vehicle has been parked in the past). The switching of the modes may be performed by a user (for example, a driver) of the vehicle 1 using the operation input unit 10 or the like to perform an operation. In another example, the mode switching unit 34 may determine whether the parking lot (parking target position) is a new parking lot or a parking lot where the vehicle has been parked in the past based on the captured image acquired by the image information acquisition unit 32*a*, and automatically switch between the learning mode and the automatic guidance mode.

The route acquisition unit 36 acquires a movement route through which the vehicle 1 is moved by the operation of the driver, for example, when the parking is performed in the learning mode, that is, when the vehicle 1 is parked in the parking lot for the first time. The movement route may be sequentially calculated and acquired based on the peripheral image including the parking target position acquired by the image information acquisition unit 32*a* and the current position of the vehicle 1 so as to be executed by a known parking assistance device. The peripheral image including the parking target position and the current position of the vehicle 1 may be transmitted to an external system, and the movement route calculated by the system may be received and acquired.

The storage control unit 38 executes a process of storing information acquired when the vehicle 1 is parked at the parking target position in a storage device such as the SSD 14*f*. The situation information storage control unit 38*a* sequentially stores first situation information indicating the peripheral situation information, which is acquired when the vehicle 1 completes the parking at the parking target position. For example, in the learning mode, when the driver moves (parks) the vehicle 1 to the parking lot (parking target position) by a manual operation, the image information of surroundings and the distance information to objects located in the surroundings from timing when the vehicle 1 reaches the vicinity of the parking lot to timing when the vehicle 1 reaches the parking target position (until parking is completed) are sequentially stored as the first situation information. As will be described later, in a case where the first situation information is updated by second situation information (situation information acquired when the vehicle 1 is moved in the automatic guidance mode), the updated first situation information is also stored.

Figure 4:
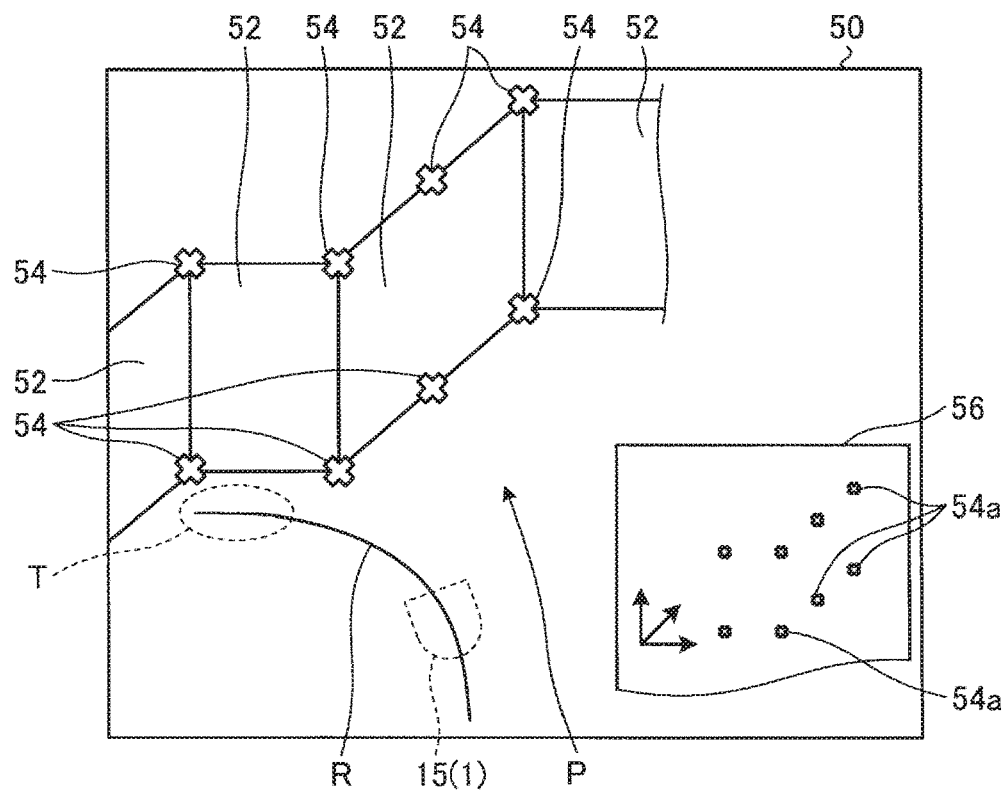
FIG. 4 is an explanatory diagram exemplarily and schematically showing a feature point of an object based on first situation information, a three-dimensional space diagram showing a parking target position and a movement route, and map data based on the first situation information in the parking assistance device according to the embodiment.

FIG. 4 is an explanatory diagram exemplarily and schematically showing a three-dimensional space diagram 50 and map data 56 based on the first situation information stored at certain timing. For the sake of explanation, a parking target position T set in a part of a home parking lot P and a movement route R for moving the vehicle 1 to the parking target position T are also shown in the three-dimensional space diagram 50. FIG. 4 shows the home parking lot P which is surrounded by wall surfaces 52 as an example of the parking lot where the vehicle 1 is parked. In a case where the wall surfaces 52 are shown on a two-dimensional image captured by the image capturing unit 15 mounted on the vehicle 1, for example, feature points 54 for specifying the wall surfaces 52 can be extracted using a well-known image processing technique. For example, features from accelerated segment test (FAST) or scale-invariant feature transform (SIFT) can be used as a technique for extracting the feature point 54, and for example, a feature point indicating a corner portion can be extracted on the captured image. It is also possible to use a well-known image processing technique such as simultaneous localization and mapping (SLAM) to acquire the map data 56 which includes map feature points 54a corresponding to the feature points 54. The situation information storage control unit 38a stores at least the map data 56 in the SSD 14f or the like as the first situation information.

Therefore, a current position of the image capturing unit 15 (vehicle 1) can be estimated by associating the second situation information which is sequentially acquired as the peripheral situation information when the same vehicle 1 as the vehicle 1 that has acquired the first situation information is newly parked at the same parking target position T with the first situation information. That is, a position of the image capturing unit 15 can be specified on the map by associating a feature amount obtained from the feature point 54 extracted from the two-dimensional captured image of the second situation information with a feature amount of each map feature point 54a in the map data 56 stored as the first situation information. That is, the current position of the vehicle 1 (the current position of the image capturing unit 15) can be estimated in three-dimensional space.

The route storage control unit 38b stores a movement route for the vehicle 1 until the vehicle 1 reaches the parking target position, that is, a movement route obtained by the route acquisition unit 36 from the timing when the vehicle 1 reaches the vicinity of the parking lot to the timing when the vehicle 1 completes movement to the parking target position T (parking completion). That is, the route storage control unit 38b stores a movement route as a (reference movement route) when the vehicle 1 completes the movement without contacting any surrounding object (for example, the wall surface 52). The storage control unit 38 may store the first situation information and the movement route R as gathered information.

Therefore, the first situation information (stored information) is collated with the second situation information (information acquired at present) so that the current position of the vehicle 1 can be specified, and the vehicle 1 can be guided to the parking target position T using the movement route R that has already been confirmed to be able to move safely to the parking target position T.

Figure 5:
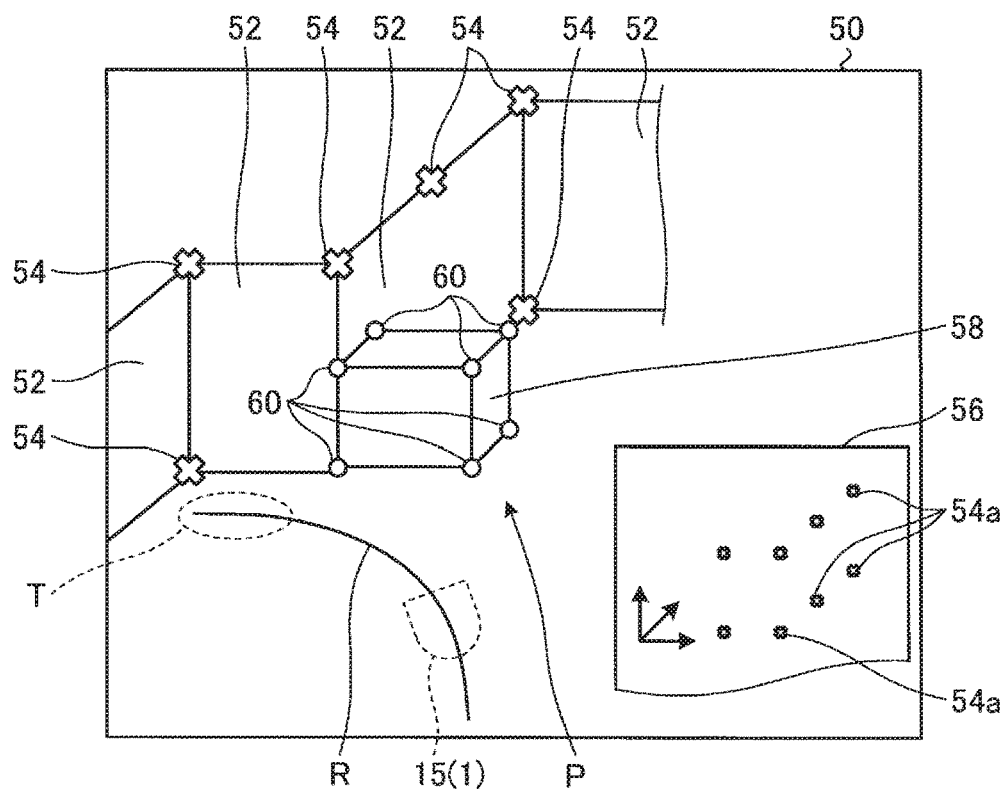
FIG. 5 is an explanatory diagram exemplarily and schematically showing a feature point of an object based on second situation information, the three-dimensional space diagram showing the parking target position and the movement route, and map data before updating by the second situation information in the parking assistance device according to the embodiment.

As shown in FIG. 5, a case where a structure 58 (for example, a shelf) is newly installed in the home parking lot P is considered, for example. In this case, when the same vehicle 1 as the vehicle 1 that has acquired the stored first situation information is newly parked at the same parking target position T of the home parking lot P where the structure 58 is installed, it is assumed that the image capturing unit 15 acquires the two-dimensional captured image indicating the peripheral situation information (second situation information). In this case, the feature points 54 of the wall surface 52 and feature points 60 of the structure 58, which are new information, are extracted from the acquired two-dimensional captured image. Therefore, correspondence between the first situation information (a feature amount of a feature point based on the wall surface 52 included in the stored map data 56) and the second situation information (a feature amount of a feature point based on the wall surface 52 and the structure 58) is not obtained (do not match each other), and the current position of the vehicle 1 cannot be specified or is in a low precision state including an error. As a result, there are inconveniences such as a position on the movement route R cannot be specified, the parking assistance cannot be continued or possibility of contacting the structure 58 increases.

Therefore, the parking assistance unit 30 of the embodiment includes the information updating unit 40 which is configured to, in a case where a predetermined condition is satisfied when there is a difference between the first situation information and the second situation information, update the first situation information by the second situation information. For example, the predetermined condition is considered to be satisfied when new information which is not included in the first situation information is included in the second situation information, and a region specified by the new information does not interfere with a region where the movement route R is located.

Figure 6:
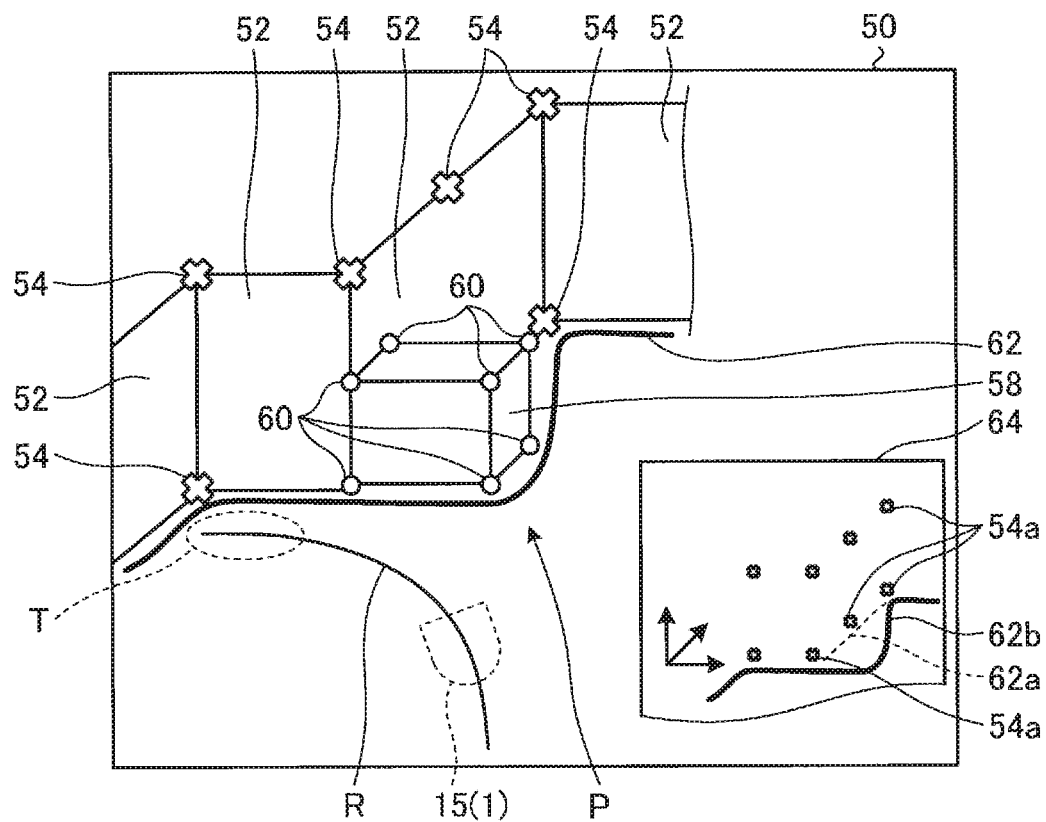
FIG. 6 is an explanatory diagram exemplarily and schematically showing a three-dimensional space diagram that shows an object boundary line, the feature point, the parking target position and the movement route based on a comparison between the first situation information and the second situation information, and map data that takes the object boundary line into consideration in the parking assistance device according to the embodiment.

The new information extracting unit 40a includes, for example, at least one of an object boundary line extracting unit 40a1 and a difference extracting unit 40a2. As shown in FIG. 6, the object boundary line extracting unit 40a1 extracts an object boundary line 62 indicating a boundary between an object region, which is recognized as a region where a three-dimensional object (for example, the wall surface 52 or the feature point 54) is present on the road surface included in the first situation information (captured image) and the second situation information (captured image), and the road surface. The object boundary line 62 can be set using a well-known image processing technique, for example, a method such as edge detection, linear approximation or machine learning. The object boundary line 62 may be a non-smooth line due to a shape or position of the three-dimensional object, resolution or recognition accuracy of the captured image, noises or the like. In such a case, well-known smoothing treatment (smoothing process) may be applied to the object boundary line 62.

The object boundary line 62 indicates a foot (a portion installed on the road surface) of the object in the home parking lot P. By reflecting the object boundary line 62 in the map data 56 shown in FIG. 5, a clear difference is generated between a position of an object boundary line 62a when the structure 58 is not present and a position of an object boundary line 62b when the structure 58 is present, as shown in map data 64 of FIG. 6. That is, the new information can be extracted based on the presence of the structure 58.

Meanwhile, the difference extracting unit 40*a*2 compares the feature amount of the feature point of the first situation information with the feature amount of the feature point of the second situation information, and extracts difference information thereof. For example, the feature point 60 of the structure 58 that is not present in the first situation information shown in FIG. 4, that is, the new information can be extracted.

The new information extracting unit 40*a* may use one of the object boundary line extracting unit 40*a*1 and the difference extracting unit 40*a*2 to extract the new information, or may use both the object boundary line extracting unit 40*a*1 and the difference extracting unit 40*a*2 to extract the new information. By using both the object boundary line extracting unit 40*a*1 and the difference extracting unit 40*a*2, extraction accuracy of the new information can be improved.

The region determination unit 40*b* determines whether the region specified by the new information, for example, a region added as an existence region of the object defined by the object boundary line 62 interferes (overlaps) with the region where the movement route R is located. For example, when the existence region of the object defined by the object boundary line 62 interferes with the region where the movement route R is located, it is determined that the movement route R cannot be used thereafter. That is, it is necessary to set a new movement route R. On the other hand, when the existence region of the object defined by the object boundary line 62 does not interfere with the region where the movement route R is located, it is determined that the vehicle 1 can be guided along the movement route R even though the new structure 58 is present. That is, the movement route R can be used thereafter.

Figure 7:
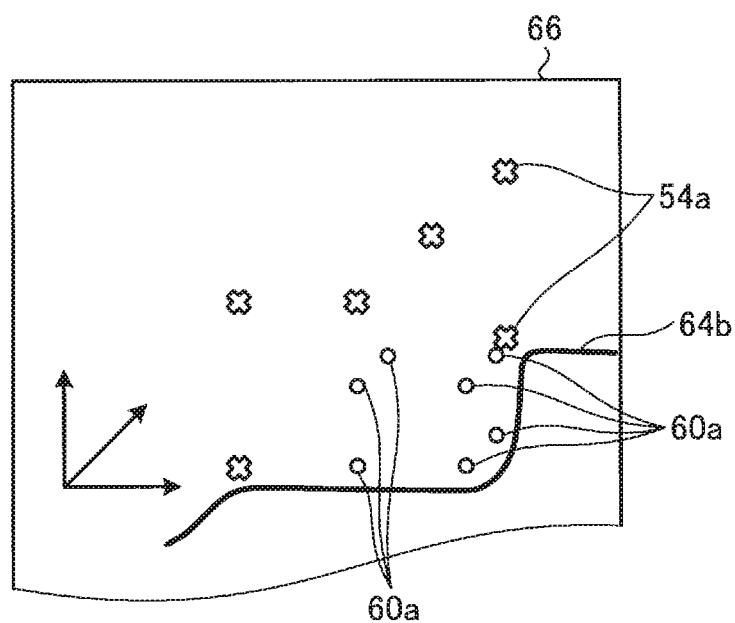
FIG. 7 is an explanatory diagram exemplarily and schematically showing map data after updating by the second situation information in the parking assistance device according to the embodiment.

In the case where, when comparing the first situation information with the second situation information, the new information which is not included in the first situation information is included in the second situation information and the region specified by the new information does not interfere with the region where the movement route R is located, the updating processing unit 40*c* updates the first situation information by the second situation information which includes the new information. That is, in a case where the new information is extracted by the new information extracting unit 40*a* and the region determination unit 40*b* determines that the existence region of the object (for example, the structure 58) defined by the object boundary line 62 does not interfere with the region where the movement route R is located, information of the object defined by the object boundary line 62 (the feature point 60 of the structure 58, the object boundary line 62*b* and the like) is reflected in the first situation information. FIG. 7 is an explanatory diagram exemplarily and schematically showing map data 66 (first situation information) after updating by the second situation information (information including the feature point 60 of the structure 58 and the object boundary line 62*b*). Therefore, next time, the first situation information (map data 66) which is compared with the second situation information acquired by the situation information acquisition unit 32 to guide the vehicle 1 to the parking target position T becomes information that takes information about the structure 58 that is considered to have newly added into consideration.

The current position estimation unit 42 estimates the current position of the vehicle 1 by comparing the first situation information with the second situation information. The first situation information is information on the surroundings acquired when the vehicle 1 moves to the parking target position T, and is information which has been confirmed that no object existing around comes into contact with the vehicle 1. Therefore, a position of the image capturing unit 15 which captures the captured image corresponding to the second situation information can be specified on the map by associating the second situation information which is sequentially acquired as the peripheral situation information when the same vehicle 1 as the vehicle 1 that has acquired the first situation information is newly parked at the same parking target position T with the first situation information. That is, the current position of the vehicle 1 can be estimated. Even when the structure 58 is newly present, the first situation information in which the information on the structure 58 is taken into consideration is generated by the updating processing unit 40*c*. Therefore, even when the vehicle 1 is newly parked toward the parking target position T in the current home parking lot P where the structure 58 is added, it is possible to estimate (specify) the current position of the image capturing unit 15 (the vehicle 1) with high accuracy by associating the currently acquired second situation information with the updated first situation information.

In this way, when the new information is extracted and the region corresponding to the movement route R which has a history of guidance does not interfere with the region based on the new information, the parking assistance unit 30 of the embodiment considers that the predetermined condition is satisfied, and uses the new information (second situation information) to update the first situation information. As a result, the first situation information, which is latest peripheral situation information, can be used in the next parking guidance control, and the current position of the vehicle 1 can be estimated with high accuracy.

The guidance control unit 44 guides the vehicle 1 to the parking target position T according to the estimated current position of the vehicle 1 and the movement route R. The route validity determination unit 44*a* determines current validity of the movement route R which is stored currently, that is, the movement route R which has a history of guiding the vehicle 1 to the parking target position T. For example, when the existence region of the object defined by the object boundary line 62 interferes with the stored region where the movement route R is located, the region determination unit 40*b* denies the validity of the movement route R. That is, it is determined that the movement route R cannot be used thereafter. In this case, the route validity determination unit 44*a* may use the display device 8 and the audio output device 9 to notify the user (driver) that the currently stored movement route R cannot be used. In this case, the driver gives a mode switching request to the mode switching unit 34 via the operation input unit 10 or the like, and switches the mode to the learning mode. That is, while moving the vehicle 1 toward the parking target position T by an own operation of the driver, the new first situation information is stored via the situation information storage control unit 38*a*, and the new movement route R is stored via the route storage control unit 38*b*. In another example, the route acquisition unit 36 performs a new route search (research) to acquire a movement route which avoids the structure 58 and reaches the parking target position T. On the other hand, when the existence region of the object defined by the object boundary line 62 does not interfere with the region where the movement route R is located, it is determined that the vehicle 1 can be guided (traveled) along the currently stored movement route R which has a history of guidance even though the structure 58 is present. That is, the movement route R can be used thereafter. In this case, the guidance control unit 44 may uses the display device 8 and the audio output device 9 to notify the user (driver) that the currently stored movement route R is valid and guidance is performed in accordance with the movement route R.

The guidance processing unit 44b performs a process for guiding the vehicle 1 to the parking target position T based on the current position of the vehicle 1, which is estimated by the current position estimation unit 42, and the movement route R. For example, in order to realize traveling assistance of moving the vehicle 1, control information is provided to the steering system 13, the brake system 18, the drive system 24 and the like. The guidance processing unit 44b performs, for example, fully automatic control of automatically controlling all of the steering system 13, the brake system 18, the drive system 24 and the like, or performs semi-automatic control of automatically controlling a part of the steering system 13, the brake system 18, the drive system 24 and the like. The guidance processing unit 44b may provide an operation guide of the steering system 13, the brake system 18, the drive system 24 and the like to the driver such that the vehicle 1 can move along the movement route R, and cause the driver to perform manual control of performing a driving operation. In this case, the guidance processing unit 44b may provide operation information to the display device 8 or the audio output device 9. The guidance processing unit 44b can also provide information on the operation of the driver, for example, an accelerator operation via the display device 8 or the audio output device 9 even when the semi-automatic control is performed.

Figure 8:
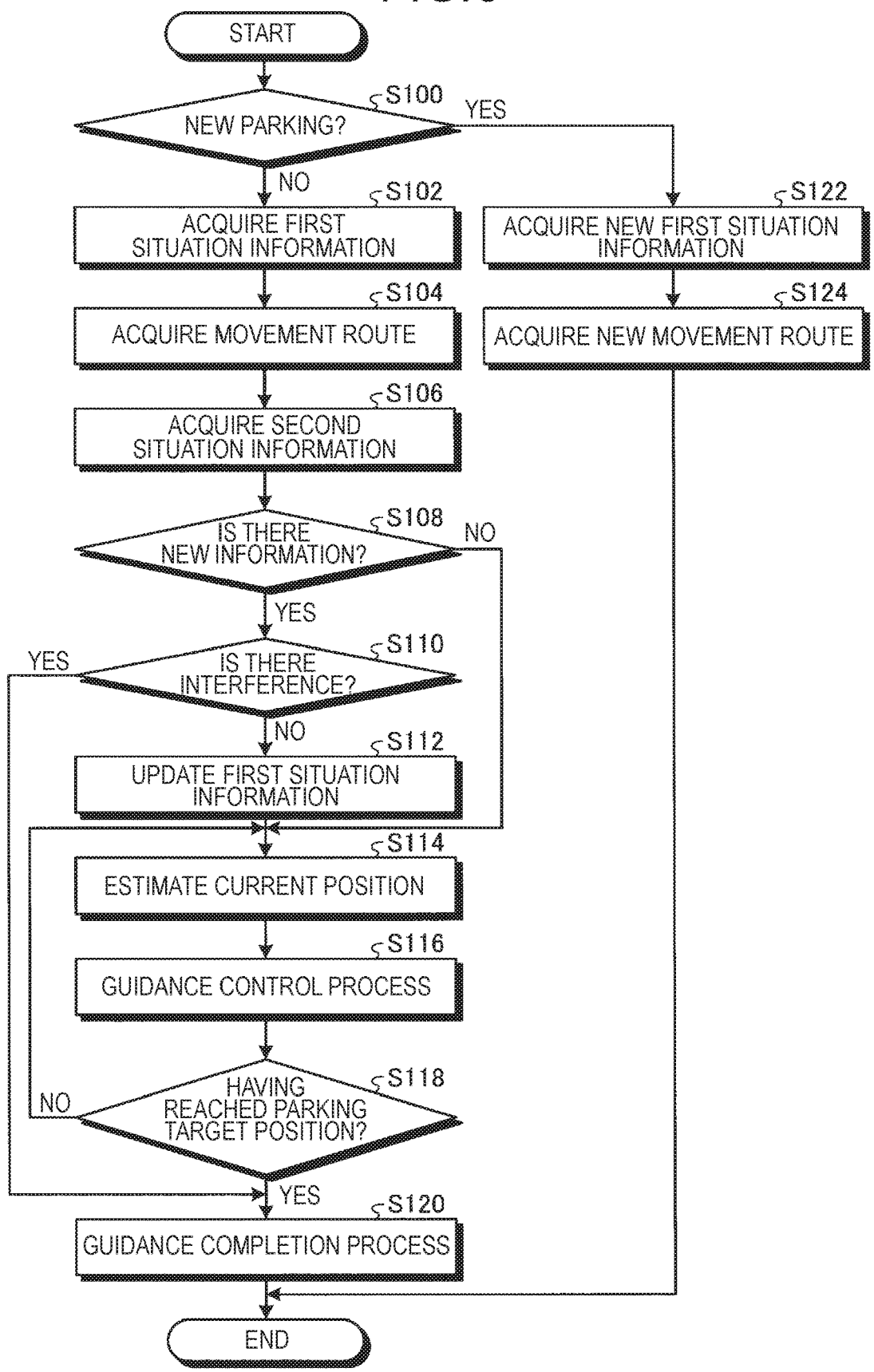
FIG. 8 is a flowchart showing an example of a flow of a parking assistance process performed by the parking assistance device according to the embodiment.

An example of a flow of the parking assistance process performed by the parking assistance device configured as described above (parking assistance unit 30) will be described with reference to a flowchart of FIG. 8.

The parking assistance unit 30 determines whether a current process is a new parking process based on a mode switching state of the mode switching unit 34 (S100). A case where the parking is not new (No in S100) is a case where the automatic guidance mode is selected by the mode switching unit 34, and the previously used movement route R is used to perform parking in a parking lot that has been used in the past (for example, the home parking lot P). In this case, the information updating unit 40 acquires the first situation information, which is past information stored in a storage device such as the SSD 14f (S102). The information updating unit 40 acquires the movement route R which has a history of guidance to the parking target position T in accordance with the first situation information which is the past information stored in the storage device such as the SSD 14f (S104). Subsequently, the situation information acquisition unit 32 uses the image capturing unit 15, the radar 16, the sonar 17 and the like to acquire the second situation information (current peripheral situation) (S106).

Then the new information extracting unit 40a determines whether there is new information based on the comparison between the first situation information acquired from the SSD 14f and the newly acquired second situation information (S108). For example, the information updating unit 40 extracts the object boundary line 62 by the object boundary line extracting unit 40a1 or extracts a difference by the difference extracting unit 40a2 so as to determine whether there is new information (for example, the information on the structure 58).

When it is determined in S108 that there is new information (Yes in S108), the region determination unit 40b determines whether the region specified by the new information interferes with the region where the movement route R having the history of guidance to the parking target position T acquired from the SSD 14f is located (S110). When the region determination unit 40b determines that the region of the new information does not interfere with the region of the movement route R (No in S110), the updating processing unit 40c uses the second situation information including the new information to update the first situation information (S112). That is, the new information (for example, information such as the object boundary line 62 including the structure 58) is reflected in the first situation information to obtain new first situation information.

The current position estimation unit 42 estimates the current position of the vehicle 1 based on the currently acquired second situation information and the updated first situation information (S114), and the guidance control unit 44 starts guidance control (S116). That is, when the region determination unit 40b determines that the region of the new information does not interfere with the region of the movement route R, the route validity determination unit 44a determines that the movement route R which is currently being referred to is valid, and the guidance processing unit 44b sequentially guides the vehicle 1 whose current position is recognized based on the movement route R. When the vehicle 1 does not reach the parking target position T (No in S118), the process returns to S114, the guidance control unit 44 estimates the current position of the vehicle 1 again based on the comparison between the first situation information and the second situation information, and continues the guidance control of the vehicle 1 according to the movement route R. On the other hand, when the vehicle 1 reaches the target parking position T (Yes in S118), the guidance control unit 44 performs a guidance completion process (S120). For example, the display device 8 and the audio output device 9 are used to notify the driver that the movement to the parking target position T is completed, the storage control unit 38 stores the latest first situation information reflecting the new information in the storage device such as the SSD 14f, makes the latest first situation information available for the next parking assistance control, and a series of the parking assistance process is temporarily ended.

When it is determined in S110 that the region of the new information interferes with the region of the movement route R (Yes in S110), the guidance control unit 44 determines that the stored movement route R cannot be used in the current parking lot (for example, the home parking lot P), the process proceeds to S120, and notification that the stored movement route R cannot be used is provided as the guidance completion process. For example, a message is output such that the driver himself/herself travels toward the parking target position T while checking the surroundings, or a message is output to guide an operation of searching for a new movement route R by the route acquisition unit 36, and the series of the parking assistance process is temporarily ended. In this case, the storage control unit 38 may perform a process of temporarily discarding the first situation information and the movement route R stored in the SSD 14f or the like.

In a case where the new information is not extracted by the information updating unit 40 in S108, that is, in a case where the stored first situation information corresponds to the currently acquired second situation information, the information updating unit 40 maintains the first situation information as non-updated. That is, the stored first situation information is directly used to estimate the current position of the vehicle 1. Therefore, the process proceeds to S114, the current position estimation unit 42 estimates the current position of the vehicle 1 based on the first situation information acquired from the SSD 14*f* and the currently acquired second situation information, and subsequent processes are continued.

In a case where it is determined in S100 that the current parking is a new parking process (Yes in S100), the situation information acquisition unit 32 acquires new first situation information obtained by using the image capturing unit 15, the radar 16, the sonar 17 and the like as the vehicle 1 moves toward the parking target position T (S122), and the situation information storage control unit 38*a* stores the new first situation information in the storage device such as the SSD 14*f* sequentially. The movement route of the vehicle 1 at that time is sequentially acquired (S124), the route storage control unit 38*b* stores the movement route in the storage device such as the SSD 14*f*, and the series of the parking assistance process is temporarily ended. That is, when parking is performed in the automatic guidance mode at the same parking target position T of the same parking lot next time, the first situation information and the movement route R stored this time are used.

In this way, according to the parking assistance device of the embodiment, in a case where a change (difference) in the peripheral situation information is confirmed and the region specified by the new information does not interfere with the region where the stored movement route R is located, it is considered that the predetermined condition is satisfied, and the first situation information is updated at that timing. That is, when the movement route R can be used thereafter, the first situation information that can be used in the estimation of the current position of the vehicle 1 is updated at that timing. As a result, when the parking assistance control is performed next time, the stored first situation information and the currently acquired second situation information can correspond to each other, the current position of the vehicle 1 can be accurately estimated, and thus highly accurate parking assistance can be performed.

Although the embodiment described above shows a case where the parking is performed in the home parking lot P, the embodiment can be applied to any case as long as the parking is performed repeatedly at the same position. For example, the embodiment can be applied to a case where parking is performed in a contract parking lot or in a parking lot used for car sharing, and the same effects can be obtained.

The parking assistance program that causes the parking assistance unit 30 (CPU 14*a*) of the embodiment to perform the parking assistance process may be provided as an installable or executable file recorded in a computer-readable recording medium such as a CD-ROM, a flexible disk (FD), a CD-R or a digital versatile disk (DVD).

Further, the parking assistance program may be stored in a computer connected to a network such as the Internet and provided by being downloaded via the network. An object detection program executed in the embodiment may be provided or distributed via a network such as the Internet.

A parking assistance device according to an embodiment of this disclosure, for example, includes: a situation information acquisition unit configured to, when a vehicle is repeatedly parked at a same parking target position, acquire peripheral situation information of a peripheral region including the parking target position detected by a detection unit provided in the vehicle; a storage control unit configured to store first situation information indicating the peripheral situation information and a movement route for reaching the parking target position, which are acquired when the vehicle completes the parking at the parking target position; an information updating unit configured to, in a case where, when comparing the first situation information with second situation information which indicates the peripheral situation information acquired when the vehicle newly parks at the parking target position, new information which is not included in the first situation information is included in the second situation information and a region specified by the new information does not interfere with a region where the movement route exists, update the first situation information by the second situation information which includes the new information; a current position estimation unit configured to estimate a current position of the vehicle by comparing the first situation information with the second situation information; and a guidance control unit configured to guide the vehicle to the parking target position according to the estimated current position and the movement route. According to such a configuration, even in a case where the peripheral situation of the parking target position is changed, a present guidance process can be continued if there is no interference between the region specified by the new information and the region where the movement route exists, and next the current position of the vehicle can be estimated with high accuracy based on the latest peripheral situation information. As a result, the guidance process using the stored movement route can be continued with high accuracy.

The information updating unit of the parking assistance device according to the embodiment of this disclosure, for example, may extract an object boundary line which is regarded as a boundary line between a road surface and an object included in the first situation information and the second situation information, and compare the first situation information with the second situation information. According to such a configuration, for example, presence or absence of interference between the region specified by the new information and the movement route can be easily determined.

The information updating unit of the parking assistance device according to the embodiment of this disclosure, for example, may extract difference information between the first situation information and the second situation information, and update the first situation information by the difference information. According to such a configuration, an update process of the first situation information can be performed with a minimum processing load when the new information is extracted.

Although the embodiment and modification disclosed here has been described, such embodiment and modification are presented as examples, and are not intended to limit the scope of the disclosure. Such new embodiments can be implemented in other various forms, and various omissions, replacements, and changes can be made without departing from the spirit of the disclosure. The embodiment and modification thereof are included in the scope and gist of the disclosure, and are also included in the disclosure described in the claims and equivalents thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assistance device comprising:
a situation information acquisition unit configured to, when a vehicle is repeatedly parked at a same parking target position, acquire peripheral situation information of a peripheral region including the parking target position detected by a detection unit provided in the vehicle;
a storage control unit configured to store first situation information indicating the peripheral situation information and a movement route for reaching the parking target position, which are acquired when the vehicle completes the parking at the parking target position;
an information updating unit configured to compare the first situation information with second situation information which indicates the peripheral situation information acquired when the vehicle newly parks at the parking target position, to determine, based on said comparison, whether new information which is not included in the first situation information is included in the second situation information and whether a region specified by the new information does not interfere with a region where the movement route exists, and to, in a case where the region specified by the new information does not interfere with a region where the movement route exists, update the first situation information stored in the storage control unit with the second situation information which includes the new information;
a current position estimation unit configured to estimate a current position of the vehicle by comparing the first situation information with the second situation information; and
a guidance control unit configured to guide the vehicle to the parking target position according to the estimated current position and the movement route.

2. The parking assistance device according to claim 1, wherein
the information updating unit extracts an object boundary line which is regarded as a boundary line between a road surface and an object included in the first situation information and the second situation information, and compares the first situation information with the second situation information.

3. The parking assistance device according to claim 1, wherein
the information updating unit extracts difference information between the first situation information and the second situation information, and updates the first situation information by the difference information.

* * * * *